United States Patent

Bell, III et al.

[11] Patent Number: 4,639,194
[45] Date of Patent: Jan. 27, 1987

[54] HYBRID GAS TURBINE ROTOR

[75] Inventors: Albert H. Bell, III, Birmingham; Jesse F. Johnson, St. Clair Shores, both of Mich.

[73] Assignee: General Motors Corporation, Detroit, Mich.

[21] Appl. No.: 606,268

[22] Filed: May 2, 1984

[51] Int. Cl.[4] ............................................. F01D 5/34
[52] U.S. Cl. ............................ 416/241 B; 416/244 A; 415/212 R
[58] Field of Search ............... 416/244, 244 A, 241 B, 416/230; 415/212 R, 213 R

[56] References Cited

U.S. PATENT DOCUMENTS

| | | | |
|---|---|---|---|
| 788,830 | 5/1905 | Hodgkinson | 416/244 A |
| 1,669,797 | 5/1928 | Wiberg | 416/244 A |
| 2,297,508 | 9/1942 | Schutte | 416/244 R |
| 2,308,307 | 1/1943 | Robinson | 415/212 R |
| 2,433,589 | 12/1947 | Adams | 416/241 B |
| 2,515,303 | 7/1950 | Isnard | 416/244 |
| 2,662,725 | 12/1953 | McVeigh | 416/96 R |
| 3,019,039 | 1/1962 | Clavell | 416/244 |
| 3,666,302 | 5/1972 | Kellett | 287/53 R |
| 3,943,703 | 3/1976 | Kronogard | 60/39.16 R |
| 4,063,850 | 12/1977 | Hueber et al. | 415/214 |
| 4,123,199 | 10/1978 | Shimizu et al. | 416/244 A |
| 4,272,954 | 6/1981 | Kronogard | 416/241 B |
| 4,408,959 | 10/1983 | Long et al. | 415/214 |
| 4,424,003 | 1/1984 | Brobeck | 416/241 B |

FOREIGN PATENT DOCUMENTS

| | | | |
|---|---|---|---|
| 95540 | 12/1983 | European Pat. Off. | 416/230 |
| 3000833 | 7/1981 | Fed. Rep. of Germany | 415/212 R |
| 219255 | 5/1942 | Switzerland | 416/241 |
| 304488 | 3/1955 | Switzerland | 415/180 |

*Primary Examiner*—Robert E. Garrett
*Assistant Examiner*—John Kwon
*Attorney, Agent, or Firm*—Saul Schwartz

[57] ABSTRACT

A hybrid gas turbine rotor having a silicon carbide ceramic turbine wheel portion and a nickel alloy steel shaft portion further includes a hollow silicon carbide ceramic stub shaft integral with the turbine wheel portion having a frustoconical outer surface tapering away from the wheel portion and a tubular end on the shaft portion having an inner frustoconical surface tapering toward the shaft portion at an angle corresponding to the outer surface taper angle. The shaft portion is connected to the wheel portion by shrink fitting the tubular end over the stub shaft so that the shrink fit is the sole medium whereby the wheel portion is supported on the shaft portion and torque is transferred therebetween.

2 Claims, 6 Drawing Figures

HYBRID GAS TURBINE ROTOR

BACKGROUND OF THE INVENTION

1. Field of the Invention

This invention relates generally to hybrid gas turbine engine rotors having ceramic and alloy metal portions and, more particularly, to a new and improved connection between the ceramic and the alloy metal portions.

2. Description of the Prior Art

Gas turbine engines have been proposed utilizing ceramic hot section components which withstand higher temperatures than corresponding alloy metal components and, therefore, offer the possibility of increased cycle temperatures and improved engine efficiency. However, because ceramic is a material not well suited to all engine operating environments, hybrid rotors have been proposed including ceramic turbine wheel portions for maximum temperature operation and alloy metal shaft portions for maximum structural integrity and durability. Because ceramic has a lower coefficient of thermal expansion than alloy metal, each of these proposals has necessarily addressed the problem of connecting the ceramic and alloy metal portions through an arrangement which transfers torque and accommodates relative thermal growth. In one proposal, the connecting arrangement includes a solid ceramic stub shaft of non-circular cross section on the turbine wheel portion received in a correspondingly shaped socket in the alloy metal shaft portion for torque transfer with resilient means between the socket and the ceramic stub shaft to accommodate relative thermal growth. In other proposals, various clamping arrangements are provided to clamp the ceramic and metal components together with resilient means provided therebetween for accommodating relative thermal growth. In still another proposal, an alloy metal shaft is brazed to a hollow ceramic stub shaft integral with the ceramic wheel portion. And in yet another proposal, the ceramic turbine wheel portion has a metal connector attached to it by a so-called "thermal insertion" technique, the metal connector having face splines for engagement with corresponding face splines on the alloy metal shaft portion and the entire assembly being axially bolted. These various ceramic-to-metal connecting arrangements are less than ideal because of uneconomical complexity and/or because they are not well suited to heat flow management through the rotor. A hybrid turbine rotor according to this invention includes a new and improved connection between a ceramic turbine wheel portion and an alloy metal shaft portion which is simple, efficient and particularly adapted for heat flow management.

SUMMARY OF THE INVENTION

Accordingly, the primary feature of this invention is that it provides a new and improved gas turbine engine hybrid rotor having a ceramic turbine wheel portion and an alloy metal shaft portion. Another feature of this invention resides in the provision in the new and improved hybrid rotor of a shrink fit connection between the ceramic wheel portion and the alloy metal shaft portion which connection is the sole structural attachment and the exclusive vehicle for torque transfer between the shaft and wheel portions. Yet another feature of this invention resides in the provision in the new and improved hybrid rotor of an integral, hollow ceramic stub shaft on the ceramic turbine wheel portion having a frustoconical outer surface tapering away from the wheel portion and in the provision of a tubular end on the metal shaft portion having a frustoconical inner surface tapering toward the shaft with a taper angle corresponding to the outer surface taper angle, the tubular end being shrunk fit over the ceramic stub shaft to effect a torque carrying and structurally rigid joint between the ceramic wheel portion and the alloy metal shaft portion. A still further feature of this invention resides in the method by which the new and improved hybrid rotor is fabricated, the method including the steps of forming on the wheel portion an integral, hollow ceramic stub shaft with a frustoconical outer surface, forming on the shaft portion an alloy metal tubular end with a frustoconical inner surface having a taper angle corresponding to the taper angle of the outer surface, placing both the wheel and the shaft portions in a heating chamber with the stub shaft outer surface partially inserted within the tubular end inner surface and with a relatively small axial force being applied to continuously urge the wheel portion toward the shaft portion, simultaneously heating the wheel and the shaft portions while urging the two together until a predetermined assembly temperature is achieved, and then cooling the wheel and the shaft portions to effect a shrink fit of the alloy metal tubular end on the hollow ceramic stub shaft.

These and other features of this invention will be readily apparent from the following specification and from the drawings wherein.

Figure 1:
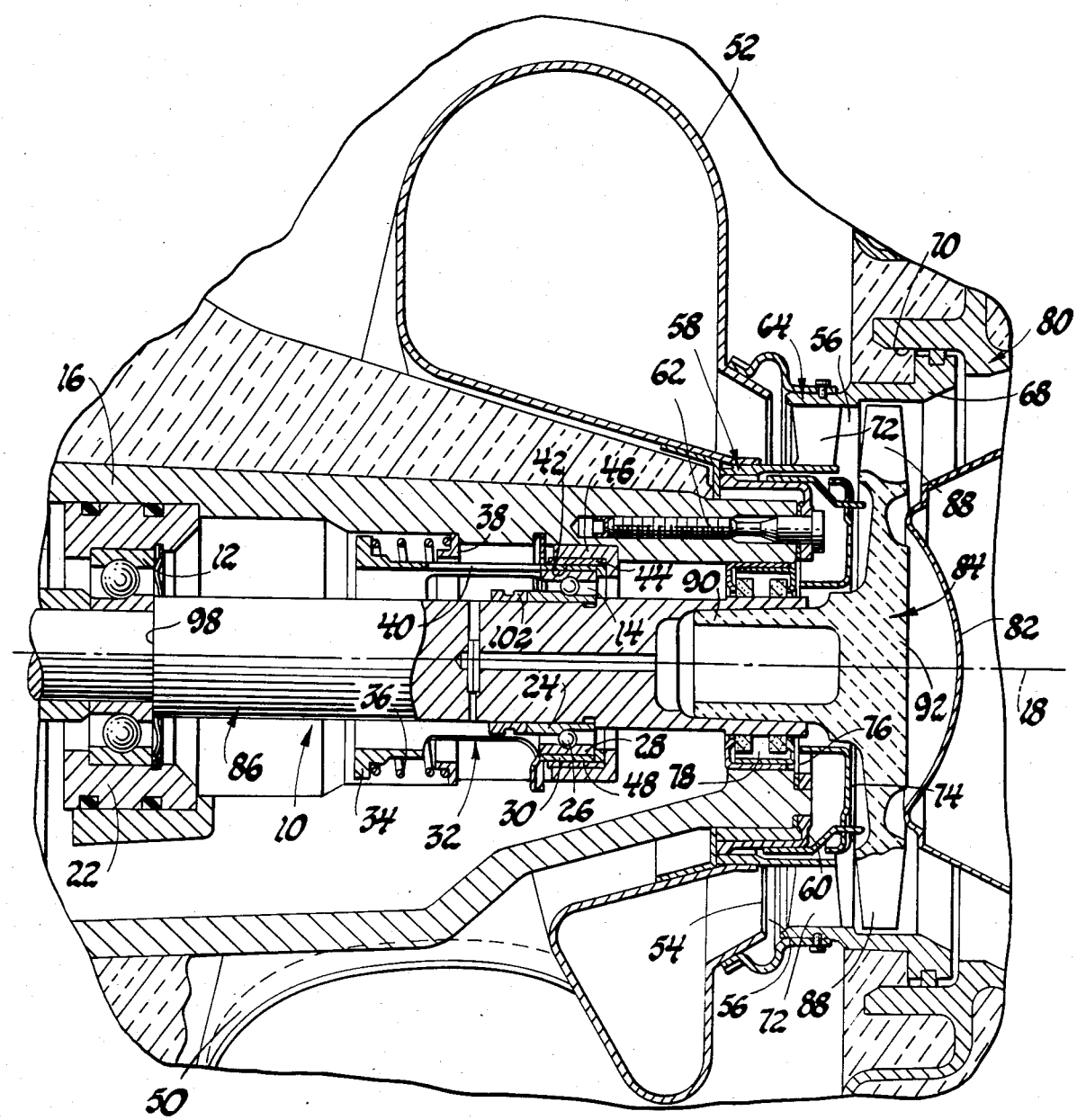
FIG. 1 is a fragmentary sectional view of a gas turbine engine having a hybrid rotor according to this invention.

Referring now to FIG. 1 of the drawings a hybrid rotor 10 according to this invention represents a part of the gasifier section of a gas turbine engine and is supported by a pair of spaced bearing assemblies 12 and 14 mounted in a housing 16 bolted in an engine block, not shown, for rotation about an axis 18 of the engine. The bearing assembly 12 is supported by a spacer 22 between the bearing and housing 16 mounted in the engine block. The bearing assembly 14 includes an inner race 24 on the rotor, antifriction balls 26, and an outer race 28. The outer race 28 is held in a flange 30 of a support 32. The support 32 has an annular base 34 biased against an appropriate shoulder on the housing 16 by a spring 36 seated against a retainer 38 and a plurality of integral arms 40 resiliently connecting the ring 34 and the flange 30. An inner cylindrical surface 42 of an annular member 44 connected to the housing 16 through a spacer 46 cooperates with an outer cylindrical surface 48 of the flange 30 in defining a squeeze film annulus therebetween. A film of oil is developed in the squeeze film annulus between the cylindrical surfaces 42 and 48 in known manner to damp vibratory displacement of the rotor.

A partially illustrated combustor 50 of the gas turbine engine is disposed in a plane generally perpendicular to the axis 18 and generates a continuous stream of hot gas motive fluid which is directed into a scroll chamber 52 wrapped around the axis 18. The scroll chamber 52 has an annular outlet 54 which defines the upstream end of an annular motive fluid flow path 56. The scroll chamber 52 has an inner connection to the housing 16 through a welded inner shroud and cylinder sub-assembly 58 of a nozzle assembly 64 attached to the engine block by an annular array of bolts through a flange 60 of the inner shroud and cylinder sub-assembly 58, only a single bolt 62 being shown in FIG. 1. A plurality of nozzle vanes 72 in the motive fluid flow path 56 connect the inner shroud and cylinder sub-assembly 58 to an outer shroud 68 which is sealed against a cylindrical surface 70 defined on a power turbine nozzle assembly 80 which is mounted on the engine block. A first annular baffle assembly 74 extends radially inward from just inboard of the inner shroud and cylinder sub-assembly 58 to a circular separator plate 76 captured between the housing 16 and the flange 60. A seal 78 disposed between the hybrid rotor 10 and a surrounding segment of the housing 16 separates the relatively cool and oily environment of the bearing assembly 14 from the hot gas motive fluid on the opposite side of the separator plate 76 and the first baffle 74. A plurality of power turbine nozzle vanes are disposed in the flow path 56 downstream of the nozzle vanes 72 between the power turbine nozzle outer shroud and a second baffle assembly 82 and function to direct the motive fluid against power turbine blades, not shown, in the flow path 56 further downstream.

Figure 2:
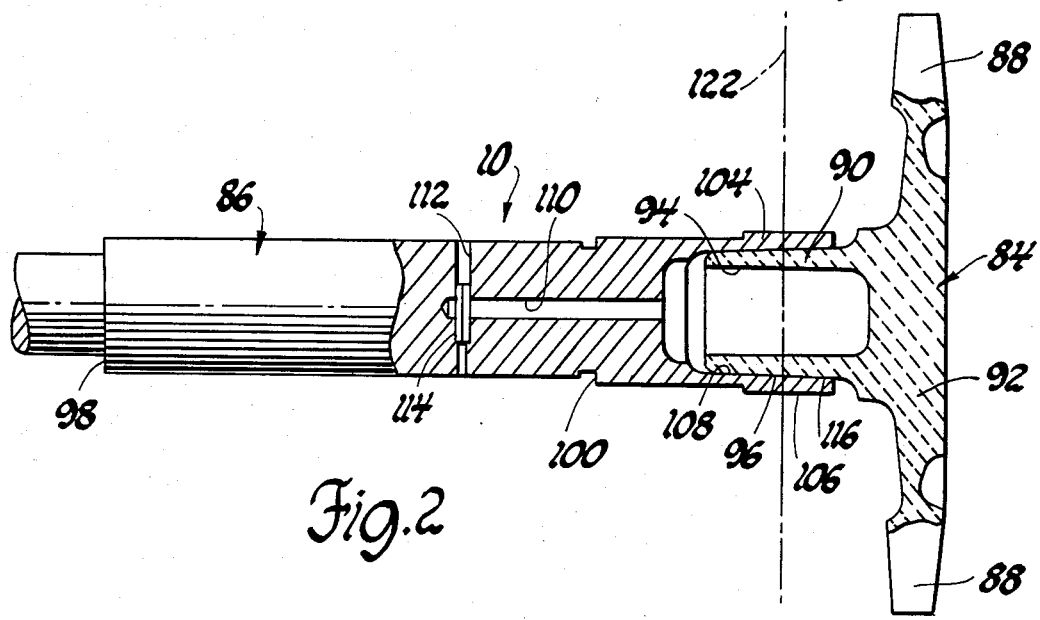
FIG. 2 is an enlarged view of a portion of FIG. 1 showing particularly the hybrid rotor according to this invention.

As seen best in FIGS. 1 and 2, the hybrid rotor 10 includes a ceramic turbine wheel portion 84 and a metal shaft portion 86. The ceramic wheel portion 84 is preferably fabricated from silicon carbide and has a plurality of radial blades 88 disposed in the motive fluid flow path 56 between the nozzle vanes 72 and the power turbine nozzle vanes. Motive fluid is directed by the nozzle vanes 72 against the blades 88 whereby the turbine wheel portion 84 is rotated in known fashion. The turbine wheel portion 84 further includes a ceramic stub shaft 90 in the general form of a cylinder of silicon carbide integral with a disc or body 92 of the wheel portion. The stub shaft 90 has a cylindrical inner surface 94 and an outer frustoconical surface 96 tapering or narrowing in proportion to the distance away from the body 92 of the wheel portion. The taper angle of the outer surface 96 may be on the order of between 0.5° and 3.0°.

The metal shaft portion 86 is fabricated from low alloy steel such as commonly available SAE 4140 and has an annular shoulder 98 against which the inner race of the bearing assembly 12 abuts and an annular shoulder 100 against which the inner race 24 of the bearing assembly 14 abuts. The inner race 24 is held against the shoulder 100 by a ring 102 on the shaft portion 86, FIG. 1. The metal shaft portion 86 has a tubular end 104 defining an outer cylindrical surface 106 on which the seal 78 rubs and an inner frustoconical surface 108 having a taper angle corresponding to the taper angle of outer surface 96 on the stub shaft 90, the inner surface 96 tapering or narrowing in the direction toward the center of the shaft portion. The inner surface 108 has a very thin coating of a relatively soft material, such as silver, deposited thereon by plating to a depth of about 0.002 inches. A pair of cross bores 110 and 112 in the shaft portion 86 vent the tubular end 104 for assembly purposes and are thereafter closed by a plug 114 in the bore 112. The left end, not shown, of the shaft portion 86 supports a gasifier compressor which compresses ambient air for delivery to combustor 50 for generation of hot gas motive fluid.

The metal shaft portion 86 is attached to the ceramic wheel portion 84 through a shrink fit between tubular end 104 and stub shaft 90 made possible by the fact that the coefficient of thermal expansion of the alloy metal of the tubular end 104 on the shaft portion exceeds the coefficient of thermal expansion of the ceramic of the stub shaft 90 on the wheel portion 84. The assembly procedure commences with placement of both the shaft portion 86 and the wheel portion 84 in a common heating chamber with the stub shaft 90 projecting into the tubular end 104 and with a relatively light bias urging the outer surface 96 against the inner surface 108. While separate heating of the shaft portion 86 and/or tubular end 104 to expand the inner surface 108 may be resorted to, it is preferable to heat the shaft portion 86 and the wheel portion 84 together in order to more accurately control depth of insertion by avoiding rapid heat transfer from the heated tubular end to the relatively cold stub shaft which occurs when the tubular end is heated separately. The temperature of the heating chamber is then gradually increased until the tubular end 104 and stub shaft 90 achieve a predetermined assembly temperature. As the temperature of the tubular end and stub shaft increases from ambient, the inner surface 108 expands radially relative to the outer surface 96 thereby allowing the bias force to effect gradually deeper penetration of the stub shaft into the tubular end. When the assembly temperature is achieved, an interface 116 is defined between the inner and outer surfaces 108 and 96, respectively, and the stub shaft is fully inserted. As the temperature in the heating chamber is then gradually decreased back to ambient, the inner surface 108 of the tubular end 104 stretches over the outer surface 96 of the stub shaft giving rise to normal forces directed radially inward and perpendicular to the interface 116. The normal forces cooperate with the coefficient of friction between the inner and outer surfaces 108 and 96, respectively, to generate substantial frictional forces resisting both relative axial separation between the tubular end and the stub shaft and relative rotation therebetween about axis 18.

Figure 3:
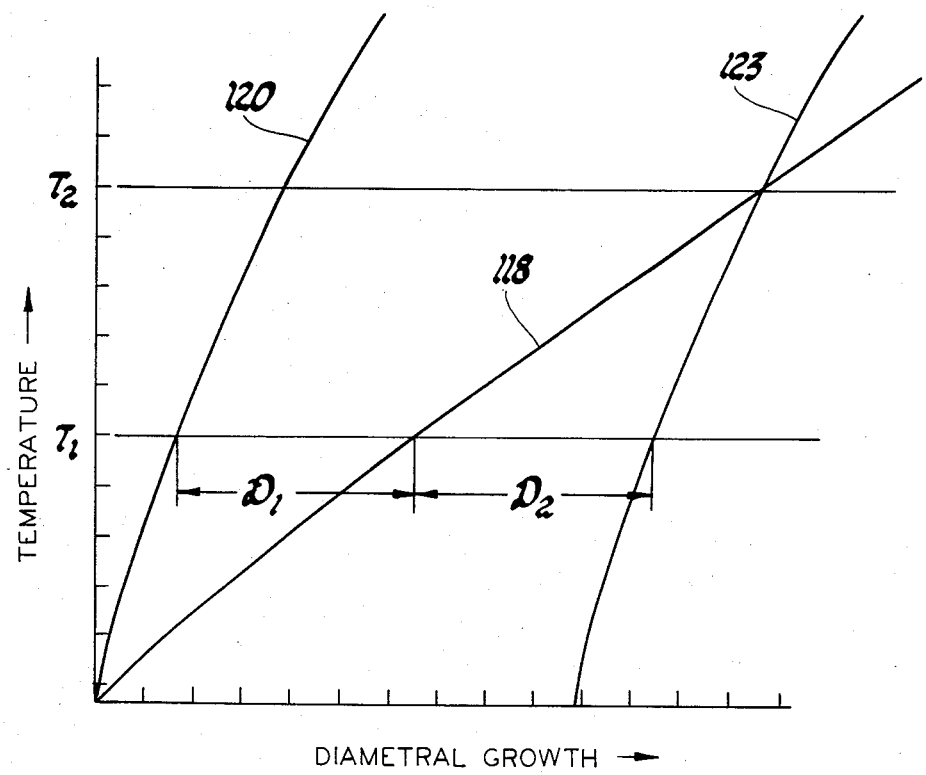
FIG. 3 is a graphic comparison of the thermal expansion characteristics of the hollow ceramic stub shaft on the turbine wheel portion and the alloy metal tubular end on the shaft portion of the hybrid rotor according to this invention.

The shrink fit between the tubular end 104 and the stub shaft 90 is the sole medium or vehicle for structural support of the turbine wheel portion 84 on the shaft portion 86 and for torque transfer therebetween. As such, it represents a balance of design considerations including torque carrying capacity, heat flow management, and material strength. With respect, first, to torque, a direct relationship exists between the amount or degree of interference achieved between the tubular end 104 and the stub shaft 90 at any operating temperature and the torque carrying capacity of the hybrid rotor at that temperature because the degree of interference determines the interface normal pressure, the frictional resistance to relative rotation, and, hence, the torque capacity. In FIG. 3, a pair of curves 118 and 120 represent the relative diametral thermal growth of the inner and outer surfaces 108 and 96, respectively, at a representative transverse plane 122, FIG. 2, when both diameters are equal at ambient temperature. At a temperature $T_1$, arbitrarily assumed for example purposes to be representative of the highest temperature to which the shrink fit connection will be exposed during engine operation, the horizontal distance $D_1$ represents the amount by which the diametral thermal growth of inner surface 108 exceeds that of outer surface 96. Assuming further that diametral interference between the inner and the outer surfaces 108 and 96, respectively, equal to $D_1$ is required at $T_1$ to provide the necessary torque carrying capacity, then forming the outer surface 96 oversize relative to the inner surface 108 by an amount equal to $D_1$ produces the required interference at $T_1$. A curve 123, FIG. 3, represents the diametral thermal growth of such an oversize outer surface 96 and the horizontal distance $D_2$, equal to $D_1$, is the amount of interference achieved at $T_1$. Also evident from FIG. 3, the intersection of curves 118 and 123 defines the assembly temperature $T_2$ to which both the tubular end 104 and the stub shaft 90 must be raised to effect penetration sufficient to yield interference $D_2$ at operating temperature $T_1$.

Figure 4:
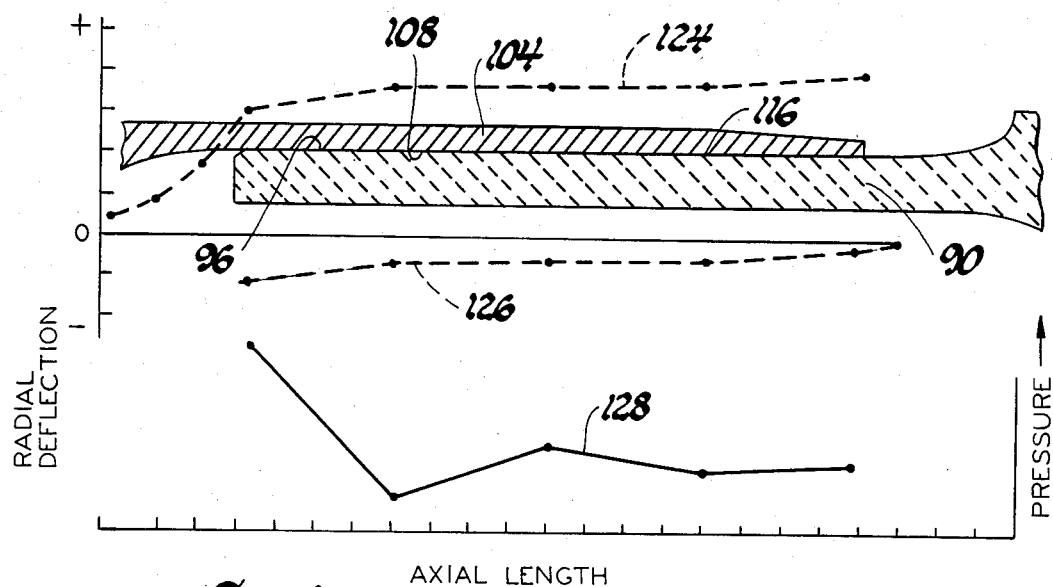
FIG. 4 is a graphic illustration of the radial deflections of the ceramic stub shaft and the alloy metal tubular end and of the interface normal pressure between the inner and outer frustoconical surfaces after assembly of the hybrid rotor according to this invention.

With respect to material strength and referring to FIG. 4, a pair of curves 124 and 126 representing, respectively, the radial deflections of the inner and outer surfaces 108 and 96 at plane 122 and at temperature $T_1$ are superimposed on an enlarged cross sectional view showing the interface 116. Because of the interference achieved, the outer surface 96 is negatively deflected in compression along substantially the entire length of interface 116 while the inner surface 108 is positively deflected in expansion generally along the entire length of interface 116. In addition, a curve 128 represents the interface normal pressure along the length of interface 116. From a material strength standpoint, then, the alloy metal of the tubular end must have sufficient strength to withstand the hoop stresses imposed on the tubular end 104 by the deflections represented by curve 124 while the ceramic of the stub shaft 90 must withstand the deflections represented by curve 126.

With respect to heat flow management, the stub shaft 90 and the tubular end 104 cooperatively function as a heat dam to control the flow of heat from the wheel portion to the shaft portion. Because the wheel portion 84 operates at a considerably higher temperature than the shaft portion 86 due to its direct exposure to hot gas motive fluid, heat will flow in the direction of the shaft portion. Too much heat flow can adversely affect the seal 78 and the bearing assembly 14 while too little heat flow can adversely affect the wheel portion 84. Accordingly, the cross sectional area of the cylindrical stub shaft 90 and the cross sectional area of the tubular end 104 limit the quantity of heat which can pass between the two. For example, fabricating the stub shaft 90 as a solid appendage rather than a cylindrical flange would produce a stronger stub shaft but would result in excessive heat flow into the shaft portion. Accordingly, the cross sectional area dimensions of the stub shaft 90 and the tubular end 104 represent a balance between the heat flow requirements and the material strength requirements for durability of the shaft portion 86 and the turbine wheel portion 84 as well as other components such as bearing assembly 14 and seal 78.

The inner and outer surfaces 108 and 96 are tapered to facilitate assembly of the shaft portion 86 and the turbine wheel portion 84 in addition to the fact that by using a tapered interface precise control of the interference fit does not depend on precise machining of matching diameters. More particularly, if the stub shaft and tubular end were cylindrical instead of tapered, mechanical axial positioning would be necessary during the heating step to insure proper penetration depth of the stub shaft into the tubular end. However, because of the taper and because the outer surface 96 is smaller than the inner surface 108, penetration of the stub shaft is controlled by the assembly temperature. The stub shaft does not achieve penetration to the required depth in the tubular end until the predetermined assembly temperature $T_2$ providing the calculated expansion of the inner surface is achieved. Therefore, calibration of the depth of penetration of the stub shaft 90 in the tubular end 104 to provide the desired interference fit at interface 116 requires only monitoring of the temperature achieved by the shaft portion 86 and the wheel portion 84 while maintaining the bias urging the two together, a considerably less complicated task than actually measuring the depth of penetration while the parts are hot.

Figure 5:
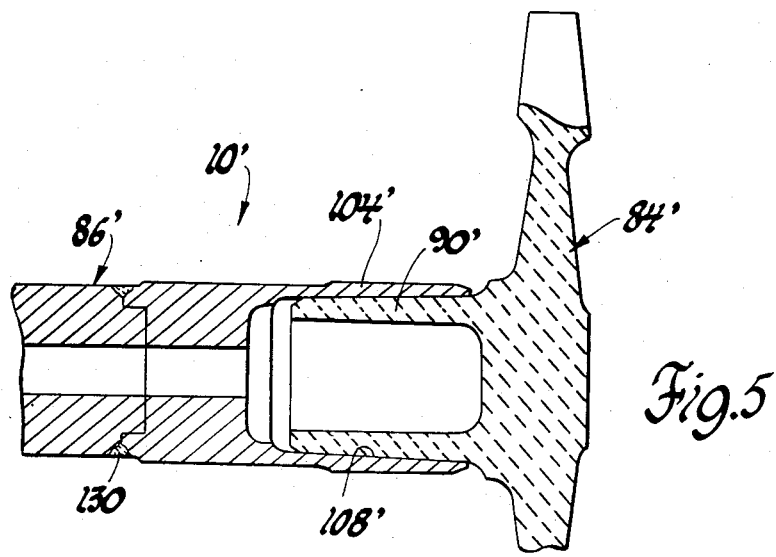
FIG. 5 is similar to FIG. 2 but showing a first modified embodiment of the hybrid rotor according to this invention.

Referring now to FIG. 5 wherein primed reference characters correspond to the same unprimed reference characters in FIGS. 1 and 2, a first modified hybrid rotor 10' is illustrated including a ceramic wheel portion 84' and a metal shaft portion 86'. The wheel portion 84' is identical to the wheel portion 84 of the embodiment shown in FIGS. 1 and 2 and includes a stub shaft 90'. The shaft portion 86' is identical to shaft portion 86 of the embodiment shown in FIGS. 1 and 2 except that shaft portion 86' includes a tubular end 104' fabricated of a different alloy metal than the remainder of the shaft portion. In the embodiment illustrated in FIG. 5, the tubular end 104' is INCO 907 and the remainder of the shaft portion 86' is INCO 718, both nickel alloy steels available from International Nickel Company. The INCO 907 possesses a low coefficient of thermal expansion and good high temperature characteristics which make it preferable for higher temperature environments to the SAE 4140 of which tubular end 104 is fabricated. The tubular end 104' is otherwise identical to tubular end 104 and is attached to the remainder of shaft portion 86' at a weld 130.

Figure 6:
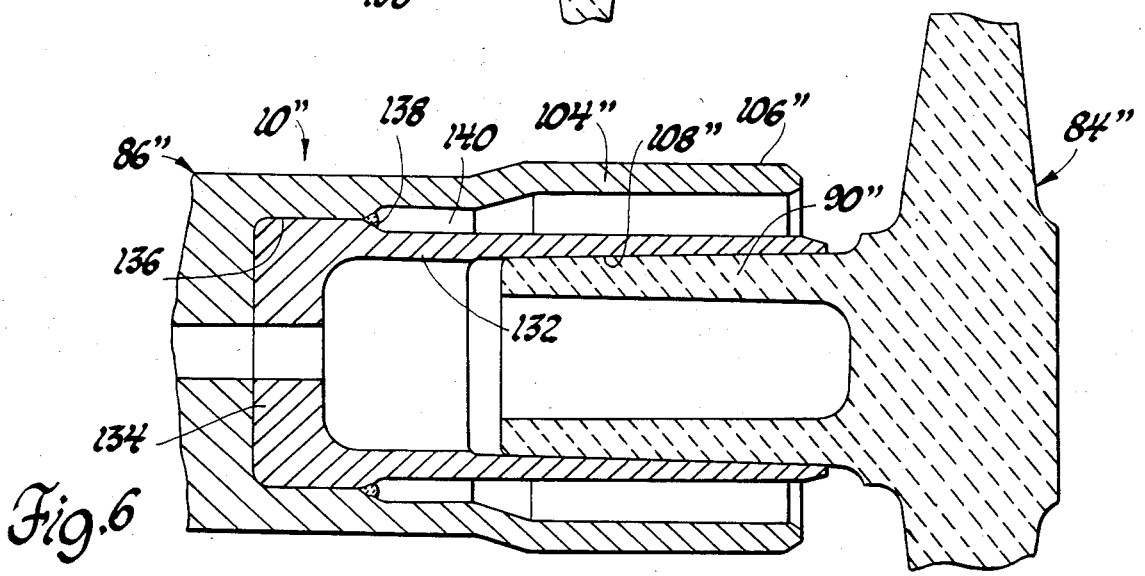
FIG. 6 is similar to FIG. 2 but showing a second modified embodiment of the hybrid rotor according to this invention.

Referring to FIG. 6 wherein double primed reference characters correspond to the same unprimed reference characters in FIGS. 1 and 2, a second modified hybrid rotor 10'' is illustrated including a ceramic wheel portion 84'' and a metal shaft portion 86''. The wheel portion 84'' has an integral ceramic stub shaft 90'' projecting therefrom which is structurally and functionally identical to stub shafts 90 and 90' except that it is generally of smaller diameter and, consequently, further restricts heat flow from the wheel portion. The shaft portion 86'' is fabricated of INCO 718, a nickel alloy steel available from International Nickel Company, and has an outer tubular end 104'' defining an outer cylindrical surface 106'' structurally and functionally corresponding to surfaces 106 and 106' on tubular ends 104 and 104'. The shaft portion 86'' further includes an inner tubular end 132 fabricated of INCO 907, a nickel alloy steel available from International Nickel Company. The inner tubular end 132 has an inner frustoconical surface 108'' tapering toward the shaft portion which surface corresponds structurally and functionally to inner surfaces 108 and 108' on tubular ends 104 and 104' respectively, except that it has a smaller diameter for interference engagement on smaller stub shaft 90". The inner tubular end 132 has a cylindrical shoulder 134 which seats in a corresponding counterbore 136 in shaft portion 86". The inner tubular end 132 is rigidly connected to the shaft portion 86" by a weld 138 at the base of an annular recess 140 between the inner and outer tubular ends 104" and 132, respectively.

The embodiments of the invention in which an exclusive property or privilege is claimed are defined as follows:

1. In a hybrid turbine rotor for a gas turbine engine, the combination comprising, a ceramic turbine wheel portion having a plurality of turbine blades therearound, a hollow ceramic stub shaft integral with said ceramic turbine wheel portion having a first coefficient of thermal expansion and a frustoconical outer surface with a predetermined taper angle and defining in cross section an annulus of predetermined area, said stub shaft being perpendicular to the plane of said turbine wheel portion with said frustoconical outer surface tapering axially away from said turbine wheel portion so that heat flow between said stub shaft and said turbine wheel portion is only through said annulus of predetermined area, an alloy metal shaft portion, and an alloy metal tubular end welded to said alloy metal shaft portion having a second coefficient of thermal expansion exceeding said first coefficient of thermal expansion and a frustoconical inner surface axially tapering toward said shaft at a taper angle corresponding to said outer surface taper angle, said tubular end being shrunk fit over said stub shaft on the opposite side of said annulus of predetermined area from said turbine wheel portion and with predetermined diametral interference between said outer and said inner surfaces at all operating temperatures of said hybrid rotor whereby torque transfer between said stub shaft and said tubular end occurs only at the shrunk fit interface between said outer and said inner surfaces and whereby all heat flow between said alloy metal shaft portion and said turbine wheel portion is through said annulus of predetermined area.

2. The combination recited in claim 1 wherein said ceramic stub shaft and said ceramic turbine wheel portion are fabricated from silicon carbide and said tubular end and said alloy metal shaft portion are fabricated from nickel alloy steel.

* * * * *